United States Patent
Wang et al.

(10) Patent No.: US 11,373,062 B1
(45) Date of Patent: Jun. 28, 2022

(54) MODEL TRAINING METHOD, DATA PROCESSING METHOD, ELECTRONIC DEVICE, AND PROGRAM PRODUCT

(71) Applicant: EMC IP Holding Company LLC, Hopkinton, MA (US)

(72) Inventors: Zijia Wang, WeiFang (CN); Jiacheng Ni, Shanghai (CN); Xuwei Tang, Nanjing (CN); Zhen Jia, Shanghai (CN); Jin Ru Yan, Shanghai (CN); Chenxi Hu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/200,986

(22) Filed: Mar. 15, 2021

(30) Foreign Application Priority Data

Jan. 29, 2021 (CN) .......................... 202110126721.7

(51) Int. Cl.
*G06K 9/62* (2022.01)
*H04L 67/568* (2022.01)
(Continued)

(52) U.S. Cl.
CPC ......... *G06K 9/6256* (2013.01); *G06K 9/6262* (2013.01); *G06N 3/08* (2013.01);
(Continued)

(58) Field of Classification Search
CPC ...... G06K 9/6256; G06K 9/6262; G06N 3/08; H04L 41/12; H04L 41/145; H04L 41/5009; H04L 67/2842
See application file for complete search history.

(56) References Cited

U.S. PATENT DOCUMENTS 9,191,304 B1 * 11/2015 Plate ................... H04L 12/6418
2012/0041914 A1 * 2/2012 Tirunagari .......... G06F 12/0893
706/15
(Continued)

OTHER PUBLICATIONS

B. Ahlgren et al., "A Survey of Information-Centric Networking," IEEE Communications Magazine, vol. 50, No. 7, Jul. 2012, pp. 26-36.

J. Morley et al., "Digitalisation, Energy and Data Demand: The Impact of Internet Traffic on Overall and Peak Electricity Consumption," Energy Research & Social Science, vol. 38, Feb. 17, 2018, pp. 128-137.

(Continued)

*Primary Examiner* — Muhammad Raza
(74) *Attorney, Agent, or Firm* — Ryan, Mason & Lewis, LLP

(57) ABSTRACT

Embodiments of the present disclosure relate to a model training method, a data processing method, an electronic device, and a computer program product. The method includes: acquiring storage information associated with a simulated network environment; and training a reinforcement learning model using simulated data and based on a simulated-data read request for a node among multiple nodes included in the simulated network environment and each having a cache. With the technical solutions of the present disclosure, the cache allocation and cache replacement problems can be simultaneously solved by using a reinforcement learning model to determine in a dynamic environment a data caching scheme that meets predetermined criteria, so that it is possible to not only improve the accuracy and efficiency of determining the data caching scheme with less cost overhead, but also improve the user experience of users using the caching system.

20 Claims, 6 Drawing Sheets

(51) Int. Cl.
    *H04L 41/12*     (2022.01)
    *H04L 41/14*     (2022.01)
    *H04L 41/5009*     (2022.01)
    *G06N 3/08*     (2006.01)

(52) U.S. Cl.
    CPC ............ *H04L 41/12* (2013.01); *H04L 41/145* (2013.01); *H04L 41/5009* (2013.01); *H04L 67/568* (2022.05)

(56) References Cited

U.S. PATENT DOCUMENTS

2019/0384711 A1* 12/2019 Lv ..................... G06F 12/0882
2020/0104260 A1* 4/2020 Lieber ................ G06F 12/0246

OTHER PUBLICATIONS

D. S. Jat et al., "An Intelligent Wireless QoS Technology for Big Data Video Delivery in WLAN," International Journal of Ambient Computing and Intelligence, vol. 9, No. 4, Oct.-Dec. 2018, 4 pages.
W. Liu et al., "Coupling DAS, SVC and NDN: An SVC-aware Cache and Forwarding Policy for NDN Routers," In Proceedings of the 2018 1st IEEE International Conference on Hot Information-Centric Networking, Aug. 2018, 6 pages.
L. Saino et al., "Icarus: A Caching Simulator for Information Centric Networking (ICN)," Seventh International Conference on Simulation Tools and Techniques, Mar. 2014, 10 pages.
U.S. Appl. No. 17/191,299 filed in the name of Zijia Wang et al. filed Mar. 3, 2021, and entitled "Method, Electronic Device, and Computer Program for Information Processing."

\* cited by examiner

MODEL TRAINING METHOD, DATA PROCESSING METHOD, ELECTRONIC DEVICE, AND PROGRAM PRODUCT

RELATED APPLICATION(S)

The present application claims priority to Chinese Patent Application No. 202110126721.7, filed Jan. 29, 2021, and entitled "Model Training Method, Data Processing Method, Electronic Device, and Program Product," which is incorporated by reference herein in its entirety.

FIELD

Embodiments of the present disclosure generally relate to computer technologies, and in particular, to a model training method, a data processing method, an electronic device, and a computer program product that can be used in the field of cache management.

BACKGROUND

Information-centric networks (ICNs) are an approach to move Internet infrastructure away from a host-centric paradigm. Meanwhile, ICNs also bring new challenges regarding cache management, content addressing, routing, and the like. There are two basic features in ICNs: (1) content is accessed by names; and (2) caches are common in the networks.

Conventionally, there are two main problems to be considered in managing a caching system in an ICN: one is cache allocation, and the other is cache replacement. Regarding cache allocation, this involves, from the viewpoint of the entire network, how to best allocate data among all network nodes, that is, the strategy decides which node should be used to cache the desired content. Regarding cache replacement, this involves, from the viewpoint of a single node, how to choose a cache replacement method for each network node, that is, the strategy should manage decisions about which objects should be cached and how long they should be cached, and, if the cache is full, decisions about which objects to evict from the cache. In addition to the above problems, the topology of an ICN may sometimes change, making it difficult to solve the cache allocation and cache replacement problems adaptively using conventional rule-based methods. The rule-based methods are static and cannot adapt to changes in the workload, resulting in the cache operating in a sub-optimal state. Therefore, the user experience of users using the cache management product is degraded.

SUMMARY

Illustrative embodiments of the present disclosure provide a model training method, an electronic device, and a computer program product.

In a first aspect of the present disclosure, a model training method is provided. The method includes: acquiring storage information associated with a simulated network environment, wherein the simulated network environment includes multiple nodes each having a cache, and the storage information indicates the usage of the cache of each node; and training a reinforcement learning model using simulated data and based on a simulated-data read request for a node among the multiple nodes, wherein the reinforcement learning model includes an environment corresponding to the simulated network environment, the reinforcement learning model includes an agent corresponding to the multiple nodes, a state corresponding to the storage information, an action corresponding to a candidate data caching scheme, and a reward corresponding to a performance evaluation of the candidate data caching scheme with regard to the simulated-data read request, and the reinforcement learning model is trained such that the performance evaluation in the reinforcement learning model satisfies a predetermined performance evaluation requirement, and such that the reinforcement learning model can be used for determining a data caching scheme for input data.

In a second aspect of the present disclosure, a data processing method is provided. The method includes: receiving input data; and determining a data caching scheme for the input data using a reinforcement learning model obtained according to the first aspect of the present disclosure.

In a third aspect of the present disclosure, an electronic device is provided. The electronic device includes: at least one processing unit; and at least one memory coupled to the at least one processing unit and storing instructions for execution by the at least one processing unit, wherein the instructions, when executed by the at least one processing unit, cause the device to perform actions including: acquiring storage information associated with a simulated network environment, wherein the simulated network environment includes multiple nodes each having a cache, and the storage information indicates the usage of the cache of each node; and training a reinforcement learning model using simulated data and based on a simulated-data read request for a node among the multiple nodes, wherein the reinforcement learning model includes an environment corresponding to the simulated network environment, the reinforcement learning model includes an agent corresponding to the multiple nodes, a state corresponding to the storage information, an action corresponding to a candidate data caching scheme, and a reward corresponding to a performance evaluation of the candidate data caching scheme with regard to the simulated-data read request, and the reinforcement learning model is trained such that the performance evaluation in the reinforcement learning model satisfies a predetermined performance evaluation requirement, and such that the reinforcement learning model can be used for determining a data caching scheme for input data.

In a fourth aspect of the present disclosure, an electronic device is provided. The electronic device includes: at least one processing unit; and at least one memory coupled to the at least one processing unit and storing instructions for execution by the at least one processing unit, wherein the instructions, when executed by the at least one processing unit, cause the device to perform actions including: receiving input data; and determining a data caching scheme for the input data using a reinforcement learning model obtained according to the third aspect of the present disclosure.

In a fifth aspect of the present disclosure, a computer program product is provided. The computer program product is tangibly stored on a non-transitory computer-readable medium and includes machine-executable instructions, wherein the machine-executable instructions, when executed, cause a machine to perform any step of the method described according to the first aspect of the present disclosure.

In a sixth aspect of the present disclosure, a computer program product is provided. The computer program product is tangibly stored on a non-transitory computer-readable medium and includes machine-executable instructions, wherein the machine-executable instructions, when executed, cause a machine to perform any step of the method described according to the second aspect of the present disclosure.

This Summary is provided to introduce the selection of concepts in a simplified form, which will be further described in the Detailed Description below. The Summary is not intended to identify key features or essential features of the embodiments of the present disclosure, nor is it intended to limit the scope of the embodiments of the present disclosure.

BRIEF DESCRIPTION OF THE DRAWINGS

The above and other objectives, features, and advantages of the present disclosure will become more apparent by the detailed description provided herein of example embodiments of the present disclosure, taken in combination with the accompanying drawings. In the example embodiments of the present disclosure, the same reference numerals generally represent the same parts.

The same or corresponding reference numerals in the various drawings represent the same or corresponding portions.

DETAILED DESCRIPTION

Figure 1:
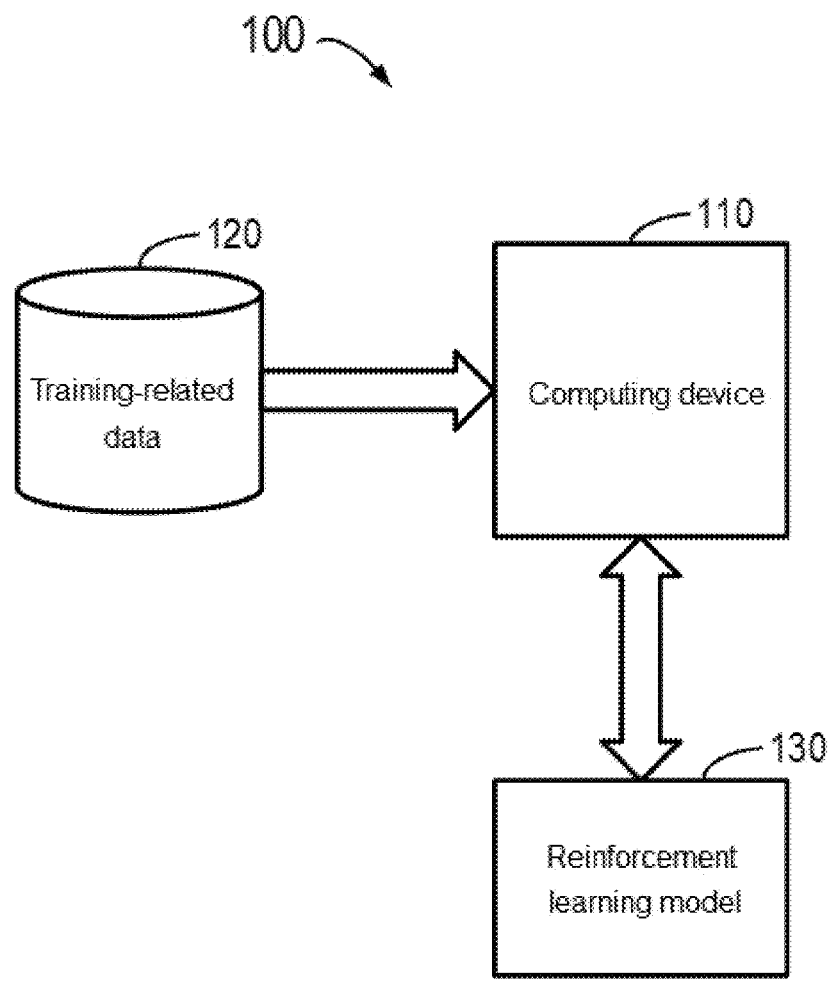
FIG. 1 illustrates a schematic diagram of example environment 100 in which devices and/or methods according to the embodiments of the present disclosure may be implemented.

Hereinafter, illustrative embodiments of the present disclosure will be described in more detail with reference to the accompanying drawings. Although illustrative embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

As used herein, the term "include" and variations thereof mean open-ended inclusion, for example, "including but not limited to." Unless specifically stated, the term "or" means "and/or." The term "based on" means "based at least in part on." The terms "an example embodiment" and "an embodiment" mean "at least one embodiment." The term "another embodiment" indicates "at least one additional embodiment." The terms "first," "second," and the like may refer to different or identical objects. Other explicit and implicit definitions may also be included below.

Information-centric networks (ICNs) have reduced the overwhelming workload to some extent and brought new technologies such as 5G. The caching mechanism is one of the core ideas of ICNs, and it does bring many benefits to the networks. However, it also brings some new problems at the same time. Although some algorithms have been developed to address these problems, they are unable to solve the problems in an adaptive and integrated manner.

Specifically, ICNs aim to change the focus of current Internet architectures. Previous architectures focus on creating conversations between two machines. This is evident in a naming system where URLs are resolved via DNS to indicate the machine with which to communicate in order to receive data or perform operations. The goal of an ICN architecture is to shift the focus from connecting to another machine to reading data. In the ICN architecture, data becomes independent of locations, applications, and storage and transmission manners, thereby supporting caching and replication in the network.

A cache stores a subset of data and acts as a layer that provides fast data access to a client terminal while reducing the pressure on the traffic on a source server. The cache can be located locally on a device such as a smartphone memory, can be located at the edge of a network such as a content delivery network (CDN), or can be hosted near a database server such as Redis, or a mixture of the foregoing.

To some extent, ICNs solve some problems by shifting the focus, but also raise some new problems. For example, a first problem arises when delivering content, and more particularly in determining which node should be selected to cache this content, which involves cache allocation. A second problem arises after selecting the node in which the content is to be stored. This second problem concerns the size limitation to these caching nodes, especially the caching nodes that are deployed on client terminal devices. When the maximum capacity of the cache is exceeded, a cache eviction algorithm should be used to decide which elements to evict, which involves cache replacement.

However, in conventional cache management products, rule-based methods have difficulty in adaptively solving the aforementioned problems. The rule-based methods are static and cannot adapt to changes in the workload, resulting in the cache operating in a sub-optimal state, having difficulty in adapting to changes in network topology and network parameters, and unable to be easily applied to new networks. Therefore, the user experience of users using the cache management product is degraded.

In order to at least partially solve one or more of the above problems and other potential problems, illustrative embodiments of the present disclosure provide a heuristic modeling method to solve the problems occurring during caching by using a reinforcement learning method, and this method is effective with respect to integration and self-adaptation. Overall, in the embodiments of the present disclosure, the main focus is on how to make it possible to determine a data caching scheme that satisfies predetermined criteria in a dynamic environment by using a reinforcement learning method, wherein this scheme can simultaneously address both cache allocation and cache replacement problems. The reinforcement learning solution for the caching strategy design problem provided in illustrative embodiments of the present disclosure can be referred to as a reinforcement learning caching system (RLCaS).

FIG. 1 illustrates a schematic block diagram of model training environment 100 in which the model training method in some embodiments of the present disclosure may be implemented. According to the embodiments of the present disclosure, model training environment 100 may be a cloud environment.

As shown in FIG. 1, model training environment 100 includes computing device 110. In model training environment 100, training-related data 120 including a simulated network environment, simulated data for training reinforcement learning model 130, and a simulated-data read request is provided to computing device 110 as an input to computing device 110. According to the embodiments of the present disclosure, training-related data 120 may also include storage information associated with the simulated network environment, topological information for multiple nodes included in the simulated network environment, data transmission information in the simulated network environment, etc.

Computing device 110 can interact with reinforcement learning model 130. For example, computing device 110 can provide at least a portion of training-related data 120 to reinforcement learning model 130, receive from reinforcement learning model 130 a data caching scheme determined by reinforcement learning model 130 based on training-related data 120 and the simulated-data read request, and issue an instruction to stop training to reinforcement learning model 130 by determining whether the data caching scheme determined by reinforcement learning model 130 can satisfy predetermined requirements.

According to the embodiments of the present disclosure, the simulated data for training reinforcement learning model 130 and the simulated-data read request may also not be included in training-related data 120, but may instead be generated by a generator in accordance with predetermined requirements or at random, where the generator is provided by computing device 110 to reinforcement learning model 130 or is included in reinforcement learning model 130 itself.

Figure 2:
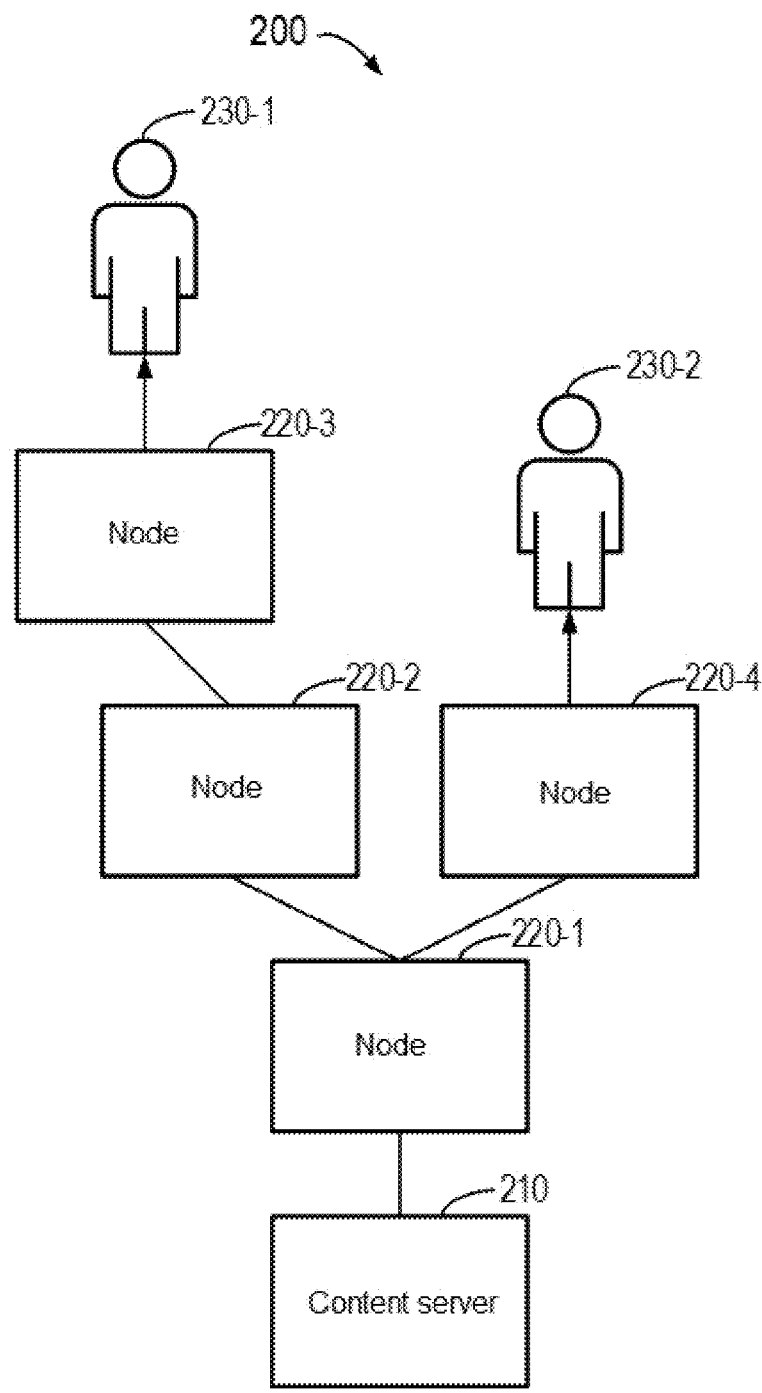
FIG. 2 illustrates a schematic diagram of simulated network environment 200 according to the embodiments of the present disclosure.

FIG. 2 illustrates a schematic diagram of simulated network environment 200 according to the embodiments of the present disclosure. As shown in FIG. 2, simulated network environment 200 includes content server 210, multiple nodes 220-1, 220-2, 220-3, and 220-4 that may be collectively referred to as nodes 220, and client terminals 230-1 and 230-2 that request data and may be collectively referred to as client terminals 230. It should be understood that simulated network environment 200 may also include more content servers 210, more nodes 220, and more client terminals 230. Nodes 220 include caches. When client terminal 230 requests data from a certain node among nodes 220 in simulated network environment 200, if this piece of data is not cached in this node, this piece of data needs to be read from content server 210 to this node for reading by client terminal 230. According to the embodiments of the present disclosure, nodes 220 may include a router.

In order that subsequent read requests from client terminal 230 for this piece of data can be responded to more quickly, simulated network environment 200 can cache this piece of data in at least one of nodes 220. However, determining which nodes should be used to cache this piece of data is a difficult problem. In conventional solutions, schemes such as leave copy everywhere (LCE), move copy done (MCD), and leave copy down (LCD) can be adopted.

In the LCE scheme, the same data is cached in each node such that the client terminal can get the fastest response when issuing a data read request. However, this scheme requires large cache space, and when the data is changed, data in the cache in each node needs to be refreshed, thus resulting in high refreshing traffic.

In the MCD scheme, data is cached only in the cache of, for example, one node from which the data has been read, thus making it possible to greatly save the cache space. However, this scheme obviously leads to a very low data read hit rate.

In the LCD scheme, when a data read hit is achieved by client terminal 230 at a certain node, data is only cached in the direct neighbor nodes of this node in the path from content server 210 to this node. Compared with the previous two schemes, this scheme is a compromise, which does not result in the need for excessive cache space, nor does it result in too low a data read hit rate. However, in this scheme, the way to determine the nodes for caching content is too single and rigid, which makes it difficult to provide a better data caching scheme.

In terms of speeding up data reads only, the expectation is that when client terminal 230 requests reading data from a certain node in simulated network environment 200, there is a high probability that the requested data has already been cached in the cache of that node, and at the same time, this piece of data is not cached in caches of too many nodes in simulated network environment 200.

As shown earlier, the problem of cache replacement also needs to be considered when using a caching system. In conventional solutions, this problem can be handled based on, for example, the following rules: first in first out (FIFO), least recently used (LRU), and least frequently used (LFU).

However, these methods are not flexible and are not suitable for dynamic environments. Also, they are clearly rule based, which also means that they can only achieve a sub-optimal state and cannot be adjusted for different workloads.

Figure 3:
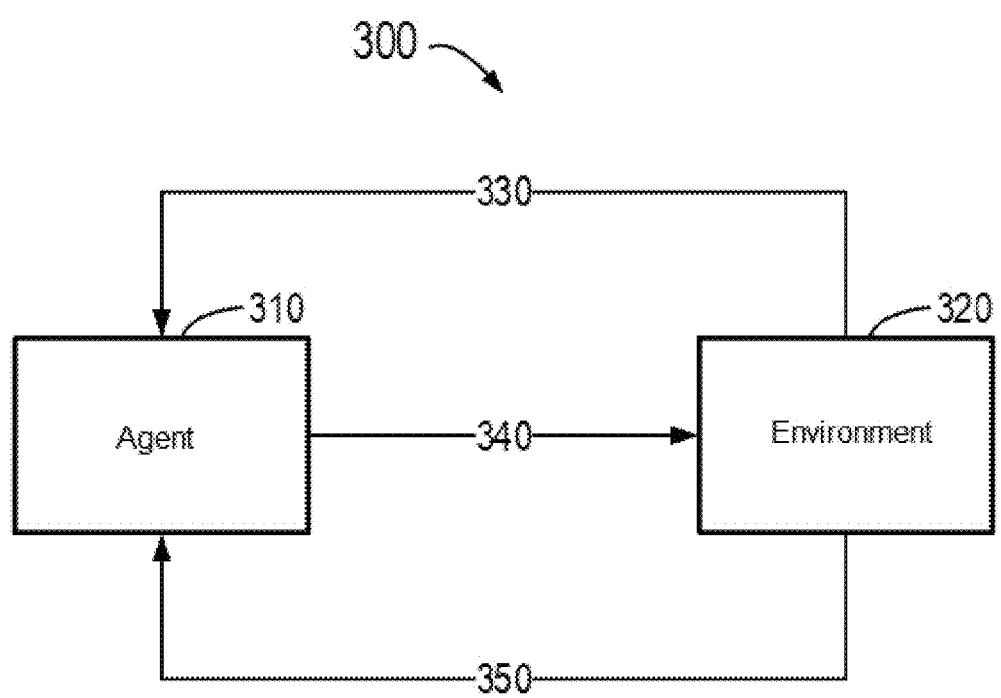
FIG. 3 illustrates a schematic diagram of reinforcement learning model 300 according to the embodiments of the present disclosure.

FIG. 3 illustrates a schematic diagram of reinforcement learning model 300 according to the embodiments of the present disclosure. Reinforcement learning (RL) is a subtype of machine learning that learns how to operate dynamically in any setting. It has been successfully applied to various problems, such as controlling complex robots, playing computer games, etc. As previously described, reinforcement learning becomes a good choice in such conditions due to the dynamic environment. Using reinforcement learning, the system learns an ideal caching strategy tailored to an individual system and its observed traffic pattern without any prior assumptions about data.

However, there is no integrated solution in conventional techniques that can address the two problems of cache allocation and cache replacement simultaneously. Moreover, although some models are starting to add reinforcement learning to their models, there is no pure reinforcement learning solution for this problem, and current hybrid approaches are not flexible enough, especially when the topology of the network changes.

Regarding reinforcement learning, due to its universality, it has been studied in many disciplines, such as game theory, cybernetics, operations research, information theory, simulation-based optimization, etc. In general, reinforcement learning is a sequential decision-making process in which an agent learns the best strategy by interacting with the environment.

As shown in FIG. 3, reinforcement learning model 300 includes agent 310 and environment 320. Arrow 330 pointing from environment 320 to agent 310 indicates the provision of a state from environment 320 to agent 310, arrow 340 pointing from agent 310 to environment 320 indicates the provision of an action by agent 310 from agent 310 to environment 320, and arrow 350 pointing from environment 320 to agent 310 indicates the provision of a reward from environment 320 to agent 310.

The goal of agent 310 is to maximize an expected sum of future rewards, which is accomplished by training multiple steps of, for example, state-action transition and selecting an action that returns the maximum discounted expected reward function. The method in illustrative embodiments of the present disclosure involves establishing an integrated system. According to embodiments of the present disclosure, more factors will be considered in such a system, and then different demands of multiple scenarios can be reflected based on flexible reward algorithms. For example, sometimes there may not be much space in a caching node, so the most important requirement is to consider space, followed by a requirement for efficiency. In this case, more weight will be given to the reward related to space, and therefore, less weight will be given to the reward related to efficiency.

According to the embodiments of the present disclosure, reinforcement learning algorithms can be classified into two categories, model-based and model-free, respectively. In model-free algorithms, the agent has no systematic prior knowledge, but instead performs operations in a real environment to understand their impact on the environment. Therefore, model-free algorithms do not require any input from developers and are very flexible and easy to set up. In contrast, model-based algorithms learn a model of an environment, and then the agent learns from interaction with the resulting model. This model provides more simulation steps for the agent, so that the agent may converge to the optimal strategy more quickly. However, the model-based approaches are very challenging for design, as the model must accurately reflect the real environment. Therefore, in subsequent embodiments described in the present disclosure, a model-free reinforcement learning algorithm is selected for simplicity of utilizing this system in practice, and a weighted reward system is used to reflect the requirements in certain situations.

Returning to FIG. 1, in model training environment 100 shown in FIG. 1, the input of training-related data 120 to computing device 110 and the interaction between computing device 110 and reinforcement learning model 130 can be performed via a network. Further, in embodiments of the present disclosure, the description is given by taking computing device 110 as an example, and computing device 110 may include any physical or virtual central processing unit, dedicated processing unit, proprietary accelerator, and the like. However, the protection scope of the present disclosure is not limited thereto, but may be applied to various computing elements, units, modules, or systems that can provide input and output processing capabilities.

It should be understood that example environment 100 is only illustrative and not restrictive, and it is extensible or shrinkable. For example, example environment 100 may include more computing devices 110, more training-related data 120 can be provided to computing devices 110 as an input, and computing devices 110 can also interact with more reinforcement learning models 130, so as to meet the demands of more users using more computing devices 110 simultaneously or even more training-related data 120 to simultaneously or non-simultaneously train reinforcement learning models 130.

Figure 4:
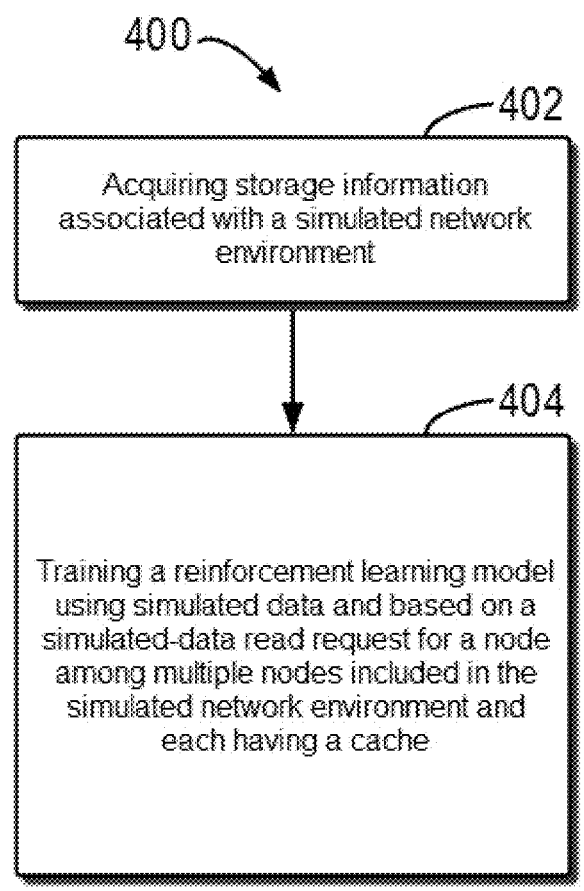
FIG. 4 illustrates a flow chart of model training method 400 according to the embodiments of the present disclosure.
Figure 5:
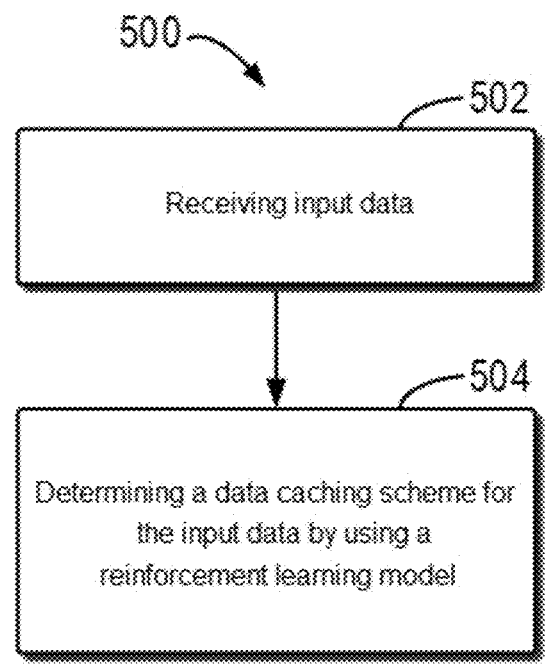
FIG. 5 illustrates a flow chart of data processing method 500 according to the embodiments of the present disclosure.

Model training method 400 and data processing method 500 shown in FIGS. 4 and 5 are illustrated below using computing device 110, training-related data 120, and reinforcement learning model 130 included in FIG. 1 as an example.

FIG. 4 illustrates a flow chart of model training method 400 according to the embodiments of the present disclosure. Method 400 may be implemented by computing device 110 shown in FIG. 1 or by other appropriate devices. It should be understood that model training method 400 may also include additional steps not shown and/or may omit the steps shown, and the scope of the embodiments of the present disclosure is not limited in this regard.

At block 402, computing device 110 acquires storage information associated with a simulated network environment. According to the embodiments of the present disclosure, the simulated network environment involved in block 402 may be simulated network environment 200 shown in FIG. 2. As shown in FIG. 2, simulated network environment 200 includes multiple nodes 220, and each node 220 has a cache that can be used to cache simulated data that a client terminal attempts to read from simulated network environment 200. The storage information associated with simulated network environment 200 can indicate the usage of the cache in each node 220, including information such as the size of the cache and the portion that has been used in each node 220.

According to some embodiments of the present disclosure, computing device 110 can also acquire topological information of nodes in simulated network environment 200. According to some other embodiments of the present disclosure, computing device 110 can also acquire topological information of nodes in simulated network environment 200 and data transmission information in simulated network environment 200, for example, information about the latency, bandwidth, etc., of data transmission between the nodes.

At block 404, computing device 110 uses simulated data for simulating data being read in simulated network environment 200 to train a reinforcement learning model based on a simulated-data read request for a node among the multiple nodes included in simulated network environment 200. According to the embodiments of the present disclosure, the reinforcement learning model involved in block 404 may be reinforcement learning model 300 illustrated in FIG. 3. Reinforcement learning model 300 includes environment 320 corresponding to simulated network environment 200, agent 310 corresponding to multiple nodes 220 in simulated network environment 200, state 330 corresponding to the storage information associated with simulated network environment 200, action 340 corresponding to a candidate data caching scheme in simulated network environment 200, and reward 350 corresponding to a performance evaluation of the candidate data caching scheme with regard to the simulated-data read request.

According to the embodiments of the present disclosure, reinforcement learning model 300 may also include multiple agents 310 corresponding to multiple nodes 220 in simulated network environment 200. For example, each node corresponds to an agent. In these embodiments, it is possible to share information related to respective states, operations, etc., among the agents through additional information interactions between the agents, and to contribute to a more fine-grained approach with nodes as objects to study reinforcement learning model 300.

According to the embodiments of the present disclosure, at block 404, reinforcement learning model 300 is trained such that the performance evaluation in reinforcement learning model 300 satisfies a predetermined performance evaluation requirement, at which point computing device 110 can instruct reinforcement learning model 300 to stop training, or reinforcement learning model 300 can automatically stop training. After training, reinforcement learning model 300 can determine a data caching scheme for the input data, and the determined data caching scheme has a high performance evaluation. The input data may include, for example, data that is stored in content server 210 of simulated network environment 200 and is to be read by client terminal 230. Since this piece of data may be input to reinforcement learning model 300 to cause reinforcement learning model 300 to be trained, it may be referred to as input data in embodiments of the present disclosure.

According to the embodiments of the present disclosure, the simulated data for training reinforcement learning model 130 and the simulated-data read request may be received from environment 320 in reinforcement learning model 130, and may be generated by a generator in accordance with predetermined requirements or at random, where the generator is provided by computing device 110 to reinforcement learning model 130 or is included in reinforcement learning model 130 itself.

According to some embodiments of the present disclosure, when topological information of the nodes in simulated network environment 200 is acquired by computing device 110 at block 402, reinforcement learning model 130 includes state 330 corresponding to the storage information and the topological information of the nodes. According to some other embodiments of the present disclosure, when the topological information of the nodes in simulated network environment 200 and the data transmission information in simulated network environment 200 are acquired by computing device 110 at block 402, reinforcement learning model 130 includes state 330 corresponding to the storage information, the topological information of the nodes, and the data transmission information.

As previously described, state 330 in reinforcement learning model 300 may correspond to the storage information associated with simulated network environment 200. Thus, in embodiments of the present disclosure, the storage information may also be referred to as state space. For the state space, if a single node is taken as an agent, the state space should be relatively simple. For example, the size of possible state space may be $2*2*2^k$, where the first 2 indicates whether the node is to be used for caching data, the second 2 indicates the phase it is currently in, such as in the allocation phase or the replacement phase, and k indicates discrete caching space, such as dividing the cache space into k blocks, and 1 is used to indicate that the kth block has been used for caching data, and 0 is used to indicate that the kth block is not used. Similarly, if the entire system is considered as an agent, the size of the state space should be $2*k^n$, where 2 indicates the phase it is currently in, e.g., in the allocation phase or the replacement phase, n indicates that there are n nodes in simulated network environment 200, and k indicates that the cache space of each node is divided into k parts.

For example, if the agent is a node and it has 4 MB of cache space for caching data, possible state 330 could be 101110, where the first 1 indicates that it is in the replacement phase, the first 0 indicates that the node will not be used for caching data, and the subsequent 1110 indicates that the first 3 MB of the cache space has been occupied and the last 1 MB has not yet been used.

For another example, if all nodes 220 in simulated network environment 200 are considered as one agent and there are 2 nodes in simulated network environment 200, each node having 2 MB of cache space available for caching, then possible state 330 may be 0010001, where the first 0 indicates that it is in the allocation phase, the subsequent 01 indicates that node 1 will not be used to cache data, and node 2 will be used to cache data, the subsequent 00 indicates that the cache space of node 1 is all empty, and the final 01 indicates that the second MB of node 2 has been occupied.

It is worth noting that, when the agent is in the replacement phase, all bits related to a representation of whether a node should be used to cache data should be 0, since no node will be used to cache data during this phase.

According to the embodiments of the present disclosure, the data caching scheme corresponding to action 340 in reinforcement learning model 300 includes at least one of the following: a cache in which the simulated data or input data is to be cached; and cached data to be cleared from that cache, wherein the remaining available space of the cache in which the simulated data or input data is to be cached is insufficient.

As previously described, action 340 in reinforcement learning model 300 may correspond to a candidate data caching scheme in simulated network environment 200. Thus, in embodiments of the present disclosure, the candidate data caching scheme may also be referred to as action space.

In the allocation phase, if a node is chosen to be used as an agent to train the model, the action space includes performing only 2 operations for whether to cache or not, and if the agent is the entire simulated network environment 200 having n nodes, the action space includes $2^n$ possible actions to determine which nodes to use for caching. For example, if there are 2 nodes in simulated network environment 200, a possible action space is 10, which indicates that node 1 is chosen to cache the space and node 0 is not used this time.

In the replacement phase, if a node with k MB of memory is chosen as an agent to train the model, the action space includes $2^k$ actions that can be taken. For example, if k is 2, the possible actions that can be taken can be represented as 10, which means that the first MB is used for caching data and the latter MB is not used. If the agent is the entire simulated network environment 200 having n nodes and each node has k MB space, then the action space includes $n^k$ actions that can be taken. For example, if k is 2 and n is 2, the possible actions that can be taken can be represented as 1001, where the first 10 indicates the cache situation of node 1 and the next 01 indicates the cache situation of node 2.

According to the embodiments of the present disclosure, if further content is introduced in simulated network environment 200, the content of the aforementioned state space and the action space may be changed accordingly. For example, the content of the state space and the action space can be changed based on the demand of client terminals, computing resource constraints, or other content.

According to the embodiments of the present disclosure, training reinforcement learning model 300 includes acquiring an initial data caching scheme and training reinforcement learning model 300 based on the initial data caching scheme. For example, prior to training reinforcement learning model 300, an initial data caching scheme that was previously determined and is applicable to simulated network environment 200 or a similar simulated network environment can be acquired first, and reinforcement learning model 300 can be trained based on the initial data caching scheme, so that the time required to train reinforcement learning model 300 can be reduced, and a more preferred data caching scheme can be obtained through training reinforcement learning model 300.

According to the embodiments of the present disclosure, training reinforcement learning model 300 includes acquiring restrictions on data caching schemes and training reinforcement learning model 300 based on the restrictions. For example, prior to training reinforcement learning model 300, user-defined restrictions on data caching schemes, such as user preferences, can be acquired first, wherein these restrictions may include, for example, which nodes the user prefers to cache data in and which types of data can be cleared preferentially in the replacement phase. By introducing these restrictions when training reinforcement learning model 300, the data caching scheme obtained from the training can reflect the personalized requirements of users.

According to the embodiments of the present disclosure, training reinforcement learning model 300 includes training reinforcement learning model 300 such that the performance evaluation in trained reinforcement learning model 300 is better than a performance evaluation of a predetermined candidate data caching scheme with regard to the simulated-data read request. For example, an initial data caching scheme that was previously determined and is applicable to simulated network environment 200 or a similar simulated network environment can be acquired first as a candidate data caching scheme, the performance evaluation of this candidate data caching scheme for the simulated-data read request can be determined, and the performance evaluation in reinforcement learning model 300 can be determined as satisfying the predetermined performance evaluation requirement by determining that the performance evaluation in trained reinforcement learning model 300 is better than the performance evaluation of a predetermined candidate data caching scheme with regard to the simulated-data read request.

According to the embodiments of the present disclosure, the performance evaluation may be indicated by a performance evaluation score which includes a weighted sum of sub-performance evaluation scores of multiple sub-performance evaluations, and training reinforcement learning model 300 includes: training reinforcement learning model 300 such that the performance evaluation score in trained reinforcement learning model 300 is higher than a predetermined performance evaluation score. For example, the sub-performance evaluations may include average cache hit rate, average link latency, average bandwidth usage, and the like. In addition, weighted summation can be performed on the scores of these sub-performance evaluations based, for example, on the specific parameters of simulated network environment 200 and user preferences, and the sub-performance evaluations of more concern can be weighted higher, such that the data caching scheme obtained through training can better reflect the preferences for the preferred sub-performance evaluations.

According to the embodiments of the present disclosure, the performance evaluation may be indicated by a performance evaluation score, wherein the performance evaluation score includes a weighted sum of sub-performance evaluation scores of multiple sub-performance evaluations, and training reinforcement learning model 300 includes: determining a data caching scheme using trained reinforcement learning model 300 and based on a candidate data caching scheme corresponding to the highest performance evaluation score among multiple performance evaluation scores in trained reinforcement learning model 300. For example, trained reinforcement learning model 300 can provide a certain number of candidate data caching schemes during the training process, for example, in a certain time period, at which point the candidate data caching scheme corresponding to the highest performance evaluation score among multiple performance evaluation scores corresponding to these candidate data caching schemes can be determined as the data caching scheme to be used, thereby making it possible to select the optimal data caching scheme from the multiple data caching schemes. In addition, it is also possible to disregard the factor of time period, but only to select, after a certain number of candidate data caching schemes are provided by reinforcement learning model 300, the optimal data caching scheme from these candidate data caching schemes.

According to the embodiments of the present disclosure, in one example, Q-learning can be used in training of reinforcement learning model 300. For example, topological information and node features such as storage information of simulated network environment 200 can be input to a graphical convolutional neural network, the graphical convolutional neural network acts as a feature extractor to extract the output of each node, these outputs are then cascaded and input to a fully connected neural network, and the fully connected neural network can then output a Q-value for each action, where the Q-value can be associated with the aforementioned performance evaluation score or can be the aforementioned performance evaluation score.

FIG. 5 illustrates a flow chart of data processing method 500 according to the embodiments of the present disclosure. Method 500 may be implemented by computing device 110 shown in FIG. 1 or by other appropriate devices. It should be understood that model training method 500 may also include additional steps not shown and/or may omit the steps shown, and the scope of the embodiments of the present disclosure is not limited in this regard.

At block 502, computing device 110 receives input data. According to the embodiments of the present disclosure, computing device 110 can also not receive the input data directly, but receive an instruction for the input data that is stored in content server 210 of simulated network environment 200 and is to be read by client terminal 230.

At block 504, computing device 110 determines a data caching scheme for the input data by using reinforcement learning model 300 obtained according to model training method 400. For example, computing device 110 can determine, with respect to the input data, in caches of which nodes in simulated network environment 200 the input data should be cached, and when the input data is cached in those caches, which pieces of data need to be cleared from those caches, or from which parts or ratios of these caches the data needs to be cleared.

Hereinbefore, with reference to FIGS. 1 to 5, relevant content has been described regarding example environment 100 in which devices and/or methods according to the embodiments of the present disclosure may be implemented, simulated network environment 200 according to the embodiments of the present disclosure, reinforcement learning model 300 according to the embodiments of the present disclosure, model training method 400 according to the embodiments of the present disclosure, and data processing method 500 according to the embodiments of the present disclosure. It should be understood that the above description is to better demonstrate the content recorded in the embodiments of the present disclosure, and is not intended to limit the present disclosure in any way.

It should be understood that the numbers of various elements and the magnitudes of physical quantities used in the embodiments of the present disclosure and the drawings are only examples, and are not intended to limit the protection scope of the embodiments of the present disclosure. The above numbers and magnitudes can be arbitrarily set as needed without affecting the normal implementation of the embodiments of the present disclosure.

Through the above description with reference to FIGS. 1 to 5, a reinforcement learning caching system (RLCaS) is provided in the technical solutions according to the embodiments of the present disclosure, thereby comprehensively solving the problems in a caching system in an ICN as described above. Specifically, the technical solutions according to the embodiments of the present disclosure have many advantages over conventional solutions.

For example, by using the technical solutions of the present disclosure, the two previously mentioned problems of cache allocation and cache replacement can be addressed in a seamlessly combined manner compared with manual combinations due to the full use of reinforcement learning, and integrated solutions can be provided as end-to-end solutions. Also, prior rule-based and machine learning-based research focuses mainly on one of the two problems of cache allocation and cache replacement that arise during caching strategy design, whereas with the technical solutions of the present disclosure, these two situations can be considered to try to find the relative optimal strategy.

For another example, by using the technical solutions of the present disclosure, flexible rewards in reinforcement learning models can be achieved. In conventional solutions, there is no one-size-fits-all systematic solution that can provide all the benefits such as efficiency, simplicity, extendibility, security, privacy, adaptability, etc., which means that people always need to balance different trade-offs in engineering designs. According to the technical solutions of the present disclosure, rewards can be adaptively added or removed based on a goal when designing rewards for an agent, and the weights of the rewards can also be changed to adjust the importance of the goal.

For another example, flexible action space can be achieved using the technical solutions of the present disclosure. According to the embodiments of the present disclosure, the action can be an existing paradigm or completely random, so that more needs can be met.

For another example, by using the technical solutions of the present disclosure, an environmental model can be eliminated. According to the embodiments of the present disclosure, there is no need to accurately model the environment of an ICN in advance, so no assumptions are required.

For another example, it is easy to adapt to new environments using the technical solutions of the present disclosure. The reinforcement learning model is continuously trained throughout the simulation process, and the direction of the training is always oriented to enhance the defined rewards. Thus, the agent can easily cope with topological differences and can even avoid other changes that occur during the training process.

For another example, using the technical solutions of the present disclosure, it is possible to train without a prior dataset. Since training data may not always be appropriate, there is no need to pre-generate training data. In addition, the defined agent can learn strategies in a completely new environment.

The technical effects of the data processing method according to the embodiments of the present disclosure in comparison to conventional solutions are described below in connection with two comparative examples.

Figure 6:
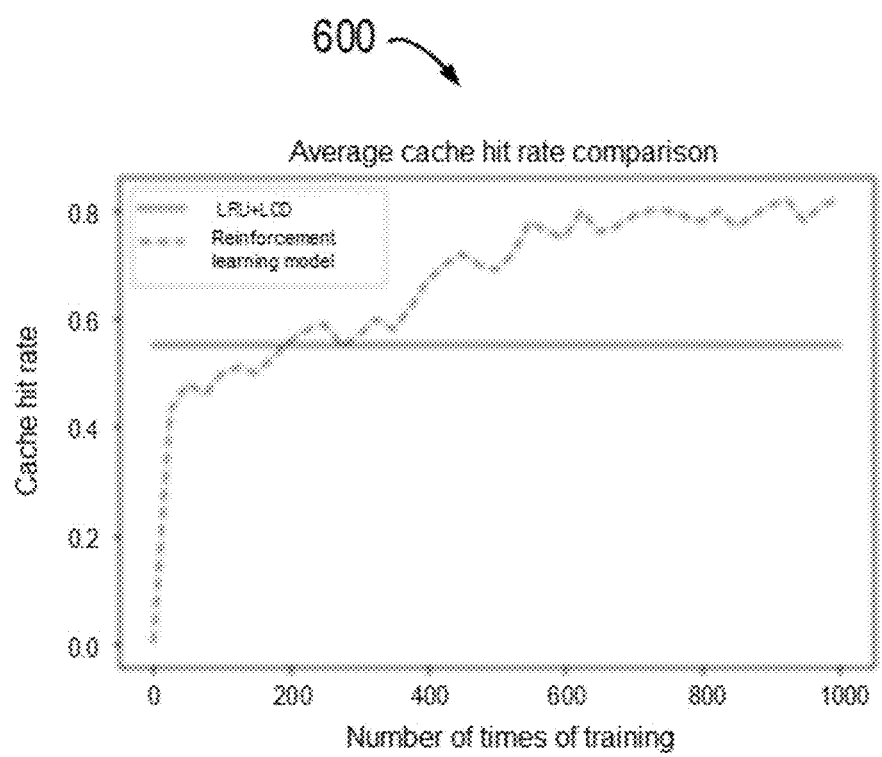
FIG. 6 illustrates a schematic diagram of average cache hit rate comparison 600 according to the embodiments of the present disclosure.

FIG. 6 illustrates a schematic diagram of average cache hit rate comparison 600 according to the embodiments of the present disclosure. In FIG. 6, the solid line indicates the average cache hit rate when using the least recently used (LRU) and leave copy down (LCD) schemes according to a conventional solution, and the dashed line indicates the average cache hit rate when using the data processing method according to the embodiments of the present disclosure. The horizontal coordinate in FIG. 6 indicates the number of times of training, where its unit can be an epoch of training, and the vertical coordinate indicates the statistical average cache hit rate, where 0.2 indicates a hit rate of 20%, and so on. It can be seen that after a certain number of times of training, significantly higher average cache hit rates can be achieved using the data processing method according to the embodiments of the present disclosure compared with the conventional solution using the LRU and LCD schemes.

Figure 7:
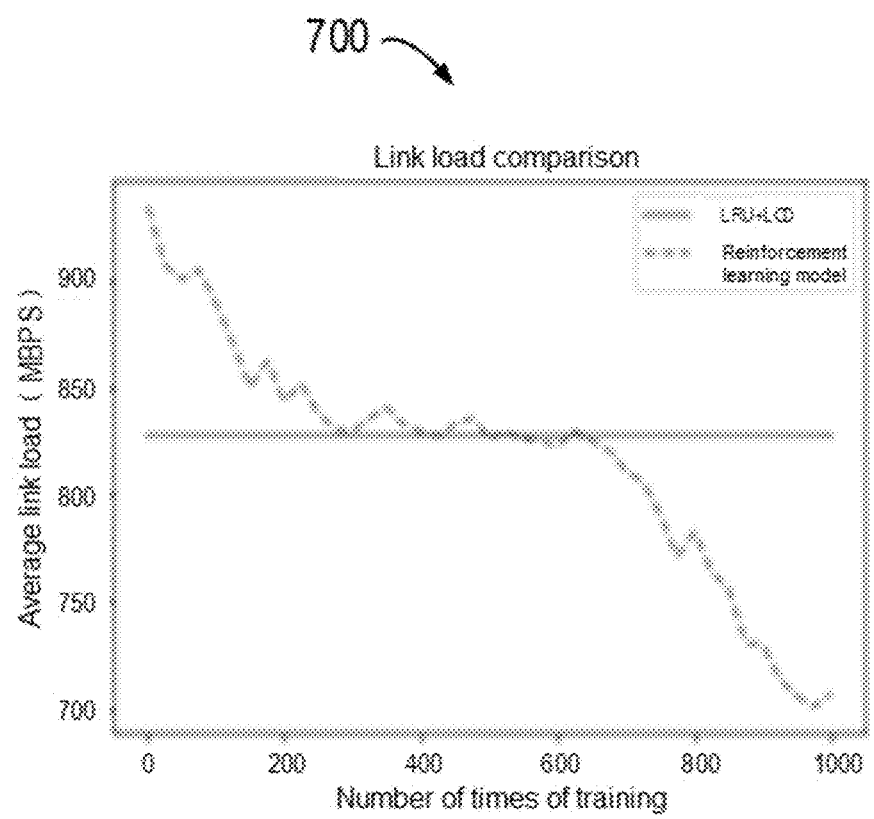
FIG. 7 illustrates a schematic diagram of link load comparison 700 according to the embodiments of the present disclosure.

FIG. 7 illustrates a schematic diagram of average link load comparison 700 according to the embodiments of the present disclosure. In FIG. 7, the solid line indicates the average link load when using the LRU and LCD schemes according to a conventional solution, and the dashed line indicates the average link load when using the data processing method according to the embodiments of the present disclosure. The horizontal coordinate in FIG. 7 indicates the number of times of training, where its unit can be an epoch of training, and the vertical coordinate indicates the statistical average link load, where its unit can be million bits per second (MBPS). It can be seen that after a certain number of times of training, significantly lower average link loads can be achieved using the data processing method according to the embodiments of the present disclosure compared with the conventional solution using the LRU and LCD schemes.

Figure 8:
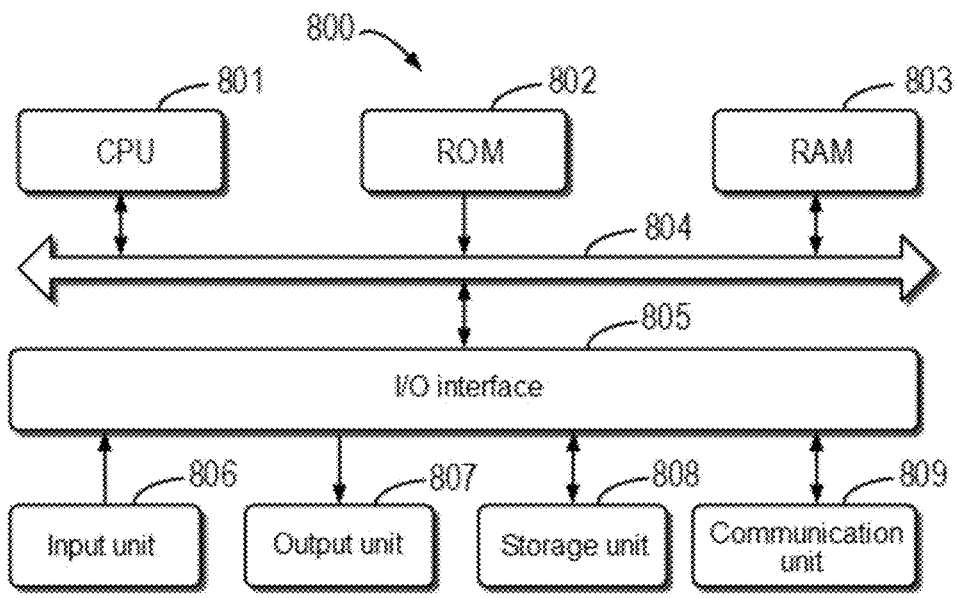
FIG. 8 illustrates a schematic block diagram of example device 800 that can be used to implement embodiments of the present disclosure.

FIG. 8 illustrates a schematic block diagram of example device 800 that can be used to implement the embodiments of the present disclosure. According to the embodiments of the present disclosure, computing device 110 in FIG. 1 may be implemented by device 800. As shown in the figure, device 800 includes central processing unit (CPU) 801, which may execute various appropriate actions and processing in accordance with computer program instructions stored in read-only memory (ROM) 802 or computer program instructions loaded from storage unit 808 onto random access memory (RAM) 803. In RAM 803, various programs and data required for the operation of device 800 may also be stored. CPU 801, ROM 802, and RAM 803 are connected to each other through bus 804. Input/output (I/O) interface 805 is also connected to bus 804.

Multiple components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices via a computer network such as the Internet and/or various telecommunication networks.

The various processes and processing described above, such as methods 400 and 500, may be performed by CPU 801. For example, in some embodiments, methods 400 and 500 may be implemented as a computer software program that is tangibly included in a machine-readable medium such as storage unit 808. In some embodiments, part or all of the computer program may be loaded and/or installed onto device 800 via ROM 802 and/or communication unit 809. One or more actions of methods 400 and 500 described above may be performed when the computer program is loaded into RAM 803 and executed by CPU 801.

The embodiments of the present disclosure may relate to a method, a device, a system, and/or a computer program product. The computer program product may include a computer-readable storage medium on which computer-readable program instructions for performing various aspects of the embodiments of the present disclosure are carried.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

Computer program instructions for performing the operations of the embodiments of the present disclosure may be assembly instructions, instruction set architecture (ISA) instructions, machine instructions, machine-related instructions, microcode, firmware instructions, state setting data, or source code or object code written in any combination of one or more programming languages, where the programming languages include object-oriented programming languages, such as Smalltalk and C++, and conventional procedural programming languages, such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user's computer over any kind of networks, including a local area network (LAN) or a wide area network (WAN), or may be connected to an external computer, for example, connected through the Internet by using an Internet service provider. In some embodiments, an electronic circuit, for example, a programmable logic circuit, a field programmable gate array (FPGA), or a programmable logic array (PLA), is personalized by utilizing state information of the computer-readable program instructions, where the electronic circuit may execute computer-readable program instructions so as to implement various aspects of the embodiments of the present disclosure.

Various aspects of the embodiments of the present disclosure are described here with reference to the flow charts and/or block diagrams of the methods, the devices/systems, and the computer program products according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms as used herein is intended to best explain the principles and practical applications of the various embodiments or technical improvements of technologies on the market, and to otherwise enable persons of ordinary skill in the art to understand the embodiments disclosed here.

What is claimed is:

1. A method, comprising:
   acquiring storage information associated with a simulated network environment, wherein the simulated network environment includes multiple nodes each having a cache, and the storage information indicates the usage of the cache of each node; and
   training a reinforcement learning model using simulated data and based on a simulated-data read request for a node among the multiple nodes, wherein the reinforcement learning model utilizes one of a first reinforcement learning algorithm that incorporates an environment model and a second reinforcement learning algorithm that does not incorporate an environment model, and wherein the reinforcement learning model includes an environment corresponding to the simulated network environment, the reinforcement learning model includes an agent corresponding to the multiple nodes, a state corresponding to the storage information, an action corresponding to a candidate data caching scheme, and a reward corresponding to a performance evaluation of the candidate data caching scheme with regard to the simulated-data read request, and the reinforcement learning model is trained such that the performance evaluation in the reinforcement learning model satisfies a predetermined performance evaluation requirement, and such that the reinforcement learning model can be used for determining a data caching scheme for input data;
   wherein acquiring the storage information includes acquiring the storage information and topological information of the multiple nodes;
   wherein the reinforcement learning model includes the state corresponding to the storage information and the topological information;
   wherein the performance evaluation is indicated by a performance evaluation score which includes a weighted sum of sub-performance evaluation scores of multiple sub-performance evaluations; and
   wherein training the reinforcement learning model includes determining a data caching scheme using the trained reinforcement learning model and based on the candidate data caching scheme corresponding to a higher performance evaluation score relative to other performance evaluation scores in the trained reinforcement learning model.

2. The method according to claim 1, wherein the simulated-data read request is received from the environment in the reinforcement learning model.

3. The method according to claim 1, wherein the data caching scheme indicates at least one of the following:
   a cache in which the simulated data is to be cached; and
   cached data to be cleared from the cache, wherein the remaining available space of the cache in which the simulated data is to be cached is insufficient.

4. The method according to claim 1, wherein training the reinforcement learning model includes:
   acquiring an initial data caching scheme; and
   training the reinforcement learning model based on the initial data caching scheme.

5. The method according to claim 1, wherein training the reinforcement learning model includes:
   acquiring restrictions on data caching schemes; and
   training the reinforcement learning model based on the restrictions.

6. The method according to claim 1, wherein training the reinforcement learning model includes:
   training the reinforcement learning model such that the performance evaluation in the trained reinforcement learning model is better than a performance evaluation of a predetermined candidate data caching scheme with regard to the simulated-data read request.

7. The method according to claim 1, wherein the performance evaluation is indicated by a performance evaluation score which includes a weighted sum of sub-performance evaluation scores of multiple sub-performance evaluations, and training the reinforcement learning model includes:
   training the reinforcement learning model such that the performance evaluation score in the trained reinforcement learning model is higher than a predetermined performance evaluation score.

8. The method according to claim 1, further comprising:
   receiving the input data; and
   determining the data caching scheme for the input data using the reinforcement learning model.

9. An electronic device, including:
   at least one hardware processing unit; and
   at least one memory coupled to the at least one hardware processing unit and storing instructions for execution by the at least one hardware processing unit, wherein the instructions, when executed by the at least one hardware processing unit, cause the electronic device to perform actions including:
   acquiring storage information associated with a simulated network environment, wherein the simulated network environment includes multiple nodes each having a cache, and the storage information indicates the usage of the cache of each node; and
   training a reinforcement learning model using simulated data and based on a simulated-data read request for a node among the multiple nodes, wherein the reinforcement learning model utilizes one of a first reinforcement learning algorithm that incorporates an environment model and a second reinforcement learning algorithm that does not incorporate an environment model, and wherein the reinforcement learning model includes an environment corresponding to the simulated network environment, the reinforcement learning model includes an agent corresponding to the multiple nodes, a state corresponding to the storage information, an action corresponding to a candidate data caching scheme, and a reward corresponding to a performance evaluation of the candidate data caching scheme with regard to the simulated-data read request, and the reinforcement learning model is trained such that the performance evaluation in the reinforcement learning model satisfies a predetermined performance evaluation requirement, and such that the reinforcement learning model can be used for determining a data caching scheme for input data;

wherein acquiring the storage information includes acquiring the storage information and topological information of the multiple nodes;

wherein the reinforcement learning model includes the state corresponding to the storage information and the topological information;

wherein the performance evaluation is indicated by a performance evaluation score which includes a weighted sum of sub-performance evaluation scores of multiple sub-performance evaluations; and wherein training the reinforcement learning model includes determining a data caching scheme using the trained reinforcement learning model and based on the candidate data caching scheme corresponding to a higher performance evaluation score relative to other performance evaluation scores in the trained reinforcement learning model.

10. The electronic device according to claim 9, wherein the simulated-data read request is received from the environment in the reinforcement learning model.

11. The electronic device according to claim 9, wherein the data caching scheme indicates at least one of the following:
   a cache in which the simulated data is to be cached; and
   cached data to be cleared from the cache, wherein the remaining available space of the cache in which the simulated data is to be cached is insufficient.

12. The electronic device according to claim 9, wherein training the reinforcement learning model includes:
   acquiring an initial data caching scheme; and
   training the reinforcement learning model based on the initial data caching scheme.

13. The electronic device according to claim 9, wherein training the reinforcement learning model includes:
   acquiring restrictions on data caching schemes; and
   training the reinforcement learning model based on the restrictions.

14. The electronic device according to claim 9, wherein training the reinforcement learning model includes:
   training the reinforcement learning model such that the performance evaluation in the trained reinforcement learning model is better than a performance evaluation of a predetermined candidate data caching scheme with regard to the simulated-data read request.

15. The electronic device according to claim 9, wherein the performance evaluation is indicated by a performance evaluation score which includes a weighted sum of sub-performance evaluation scores of multiple sub-performance evaluations, and training the reinforcement learning model includes:
   training the reinforcement learning model such that the performance evaluation score in the trained reinforcement learning model is higher than a predetermined performance evaluation score.

16. A computer program product tangibly stored on a non-transitory computer-readable medium and including machine-executable instructions, wherein the machine-executable instructions, when executed, cause a machine to perform steps of a method, the method comprising:
   acquiring storage information associated with a simulated network environment, wherein the simulated network environment includes multiple nodes each having a cache, and the storage information indicates the usage of the cache of each node; and
   training a reinforcement learning model using simulated data and based on a simulated-data read request for a node among the multiple nodes, wherein the reinforcement learning model utilizes one of a first reinforcement learning algorithm that incorporates an environment model and a second reinforcement learning algorithm that does not incorporate an environment model, and wherein the reinforcement learning model includes an environment corresponding to the simulated network environment, the reinforcement learning model includes an agent corresponding to the multiple nodes, a state corresponding to the storage information, an action corresponding to a candidate data caching scheme, and a reward corresponding to a performance evaluation of the candidate data caching scheme with regard to the simulated-data read request, and the reinforcement learning model is trained such that the performance evaluation in the reinforcement learning model satisfies a predetermined performance evaluation requirement, and such that the reinforcement learning model can be used for determining a data caching scheme for input data;

wherein acquiring the storage information includes acquiring the storage information and topological information of the multiple nodes;

wherein the reinforcement learning model includes the state corresponding to the storage information and the topological information;

wherein the performance evaluation is indicated by a performance evaluation score which includes a weighted sum of sub-performance evaluation scores of multiple sub-performance evaluations; and wherein training the reinforcement learning model includes determining a data caching scheme using the trained reinforcement learning model and based on the candidate data caching scheme corresponding to a higher performance evaluation score relative to other performance evaluation scores in the trained reinforcement learning model.

17. The computer program product according to claim 16, wherein the data caching scheme indicates at least one of the following:
   a cache in which the simulated data is to be cached; and
   cached data to be cleared from the cache, wherein the remaining available space of the cache in which the simulated data is to be cached is insufficient.

18. The computer program product according to claim 16, wherein training the reinforcement learning model includes:
   acquiring an initial data caching scheme; and
   training the reinforcement learning model based on the initial data caching scheme.

19. The computer program product according to claim 16, wherein training the reinforcement learning model includes:
   acquiring restrictions on data caching schemes; and
   training the reinforcement learning model based on the restrictions.

20. The computer program product according to claim 16, wherein training the reinforcement learning model includes:
   training the reinforcement learning model such that the performance evaluation in the trained reinforcement learning model is better than a performance evaluation of a predetermined candidate data caching scheme with regard to the simulated-data read request.

* * * * *